United States Patent
Tucker

(10) Patent No.: US 9,868,550 B2
(45) Date of Patent: Jan. 16, 2018

(54) LONG AND SHORT RANGE STORAGE AND TRANSMISSION SYSTEM ON AIRCRAFT PARTS

(75) Inventor: Brian E. Tucker, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 713 days.

(21) Appl. No.: 13/597,717

(22) Filed: Aug. 29, 2012

(65) Prior Publication Data

US 2014/0061382 A1 Mar. 6, 2014

(51) Int. Cl.
*B64F 5/00* (2017.01)
*G07C 5/00* (2006.01)
*B64F 5/50* (2017.01)
*G07C 5/08* (2006.01)

(52) U.S. Cl.
CPC .............. *B64F 5/0036* (2013.01); *B64F 5/50* (2017.01); *G07C 5/008* (2013.01); *G07C 5/085* (2013.01); *G07C 2205/02* (2013.01)

(58) Field of Classification Search
USPC .......... 340/572.1, 945, 10.51, 10.1; 244/1 R; 701/3, 34.4, 29.1
See application file for complete search history.

(56) References Cited

U.S. PATENT DOCUMENTS

| | | | |
|---|---|---|---|
| 7,047,159 B2* | 5/2006 | Muehl et al. | 702/184 |
| 7,156,312 B2 | 1/2007 | Becker et al. | |
| 8,547,230 B1* | 10/2013 | Darling et al. | 340/572.1 |
| 2004/0024570 A1* | 2/2004 | Muehl | G06Q 10/06 702/184 |
| 2007/0114280 A1* | 5/2007 | Coop et al. | 235/385 |
| 2007/0236338 A1 | 10/2007 | Maruyama | |
| 2007/0241908 A1 | 10/2007 | Coop | |
| 2009/0234517 A1 | 3/2009 | Feuillebois et al. | |
| 2011/0208973 A1 | 2/2011 | Jimenez et al. | |
| 2012/0070668 A1 | 3/2012 | Georgeson et al. | |
| 2012/0150380 A1 | 6/2012 | Whittaker | |
| 2012/0254560 A1* | 10/2012 | Craik | 711/154 |

FOREIGN PATENT DOCUMENTS

| | | |
|---|---|---|
| CN | 101044495 A | 9/2007 |
| CN | 101571965 | 11/2009 |
| EP | 1801734 A1 | 6/2007 |

OTHER PUBLICATIONS

European Search Report in related European Application No. 13162821.6, dated Jun. 4, 2013, 6 pages.

(Continued)

*Primary Examiner* — Brent Swarthout

(57) ABSTRACT

According to one embodiment, an aircraft part storage system includes a first storage device and a second storage device. The first storage device is configured to be coupled to an aircraft part and operable to store and transmit a first set of information about the aircraft part. The second storage device is configured to be coupled to the same aircraft part and operable to store and transmit a second set of information about the aircraft part. The second storage device has a larger storage capacity than the first storage device but a shorter transmission range than the first storage device.

26 Claims, 2 Drawing Sheets

(56) References Cited

OTHER PUBLICATIONS

Claire Swedberg, Eurocopter Approves RFID System for Its Aircraft, Mar. 28, 2012, RFID Journal, http://www.rfidjournal.com/article/articleview/9368/1/1/.
Claire Swedberg, Boeing to Launch RFID Program for Airlines in Feb., Jan. 11, 2012, RFID Journal, http://www.rfidjournal.com/article/view/9107/.
Christine Boynton, Boeing, Alaska Airlines to test RFID and CMB technology in component management, May 19, 2011, Air Transport World, http://atwonline.com/aircraft-engines-components/news/boeing-alaska-airlines-test-rfid-cmb-technology-component-managemen.
Official Action in related European Application No. 13162821.6, dated Aug. 23, 2013, 4 pages.
Result of Consultation in related European Application No. 13162821.6, dated Jul. 31, 2014, 4 pages.
Result of Consultation in related European Application No. 13162821.6, dated Dec. 15, 2014, 8 pages.
Office Action in related Canadian Application No. 2,825,480, dated Mar. 26, 2015, 4 pages.
Office Action in related Chinese Application No. 201310379124.0, dated Jul. 1, 2015, 11 pages.
Office Action in related Chinese Application No. 201310379124.0, dated Apr. 287, 2016, 21 pages.
Office Action in related Chinese Application No. 201310379124.0, dated Nov. 25, 2015, 11 pages.
Office Action in related Canadian Patent Application Serial No. 2,825,480, dated Feb. 19, 2016, 4 pages.
Office Action in related Canadian Patent Application Serial No. 2,825,480, dated Jan. 13, 2017, 4 pages.

\* cited by examiner

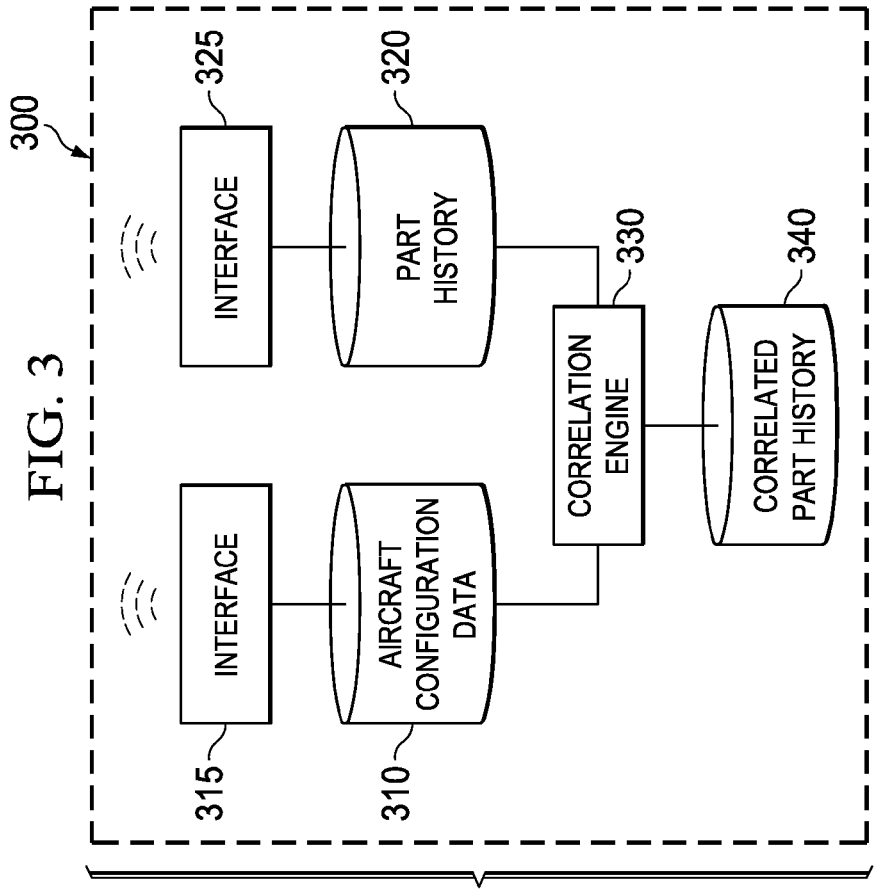
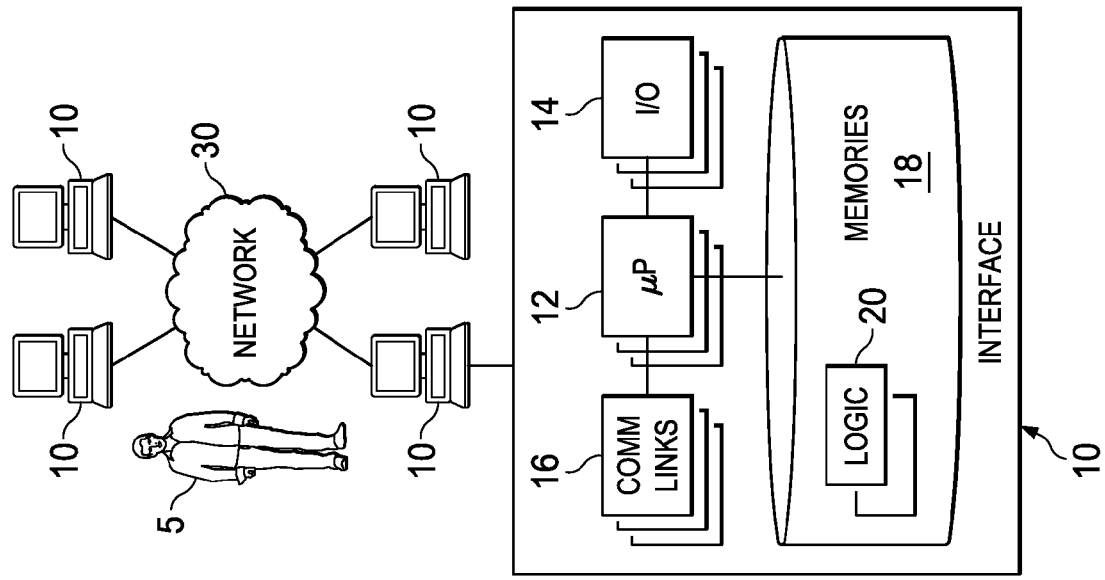

LONG AND SHORT RANGE STORAGE AND TRANSMISSION SYSTEM ON AIRCRAFT PARTS

TECHNICAL FIELD

This invention relates generally to storage solutions on aircraft parts, and more particularly, to long and short range storage and transmission system on aircraft parts.

BACKGROUND

An aircraft, such as a rotorcraft, may be manufactured from a variety of parts. Some of these parts may be moved between aircraft. Some of these parts may also be serviced, maintained, and/or replaced during the life of the part.

SUMMARY

Particular embodiments of the present disclosure may provide one or more technical advantages. A technical advantage of one embodiment may include the capability to store and transmit aircraft configuration and part history information from a part on an aircraft. A technical advantage of one embodiment may include the capability to increase the transmission range for aircraft configuration information and increase the storage capacity for part history information. A technical advantage of one embodiment may include the capability to eliminate the need for access to the Internet or part databases when servicing an aircraft part.

Certain embodiments of the present disclosure may include some, all, or none of the above advantages. One or more other technical advantages may be readily apparent to those skilled in the art from the figures, descriptions, and claims included herein.

BRIEF DESCRIPTION OF THE DRAWINGS

To provide a more complete understanding of the present invention and the features and advantages thereof, reference is made to the following description taken in conjunction with the accompanying drawings, in which:

FIG. 3 shows an aircraft part information correlation system according to one example embodiment.

DETAILED DESCRIPTION OF THE DRAWINGS

Figure 1:
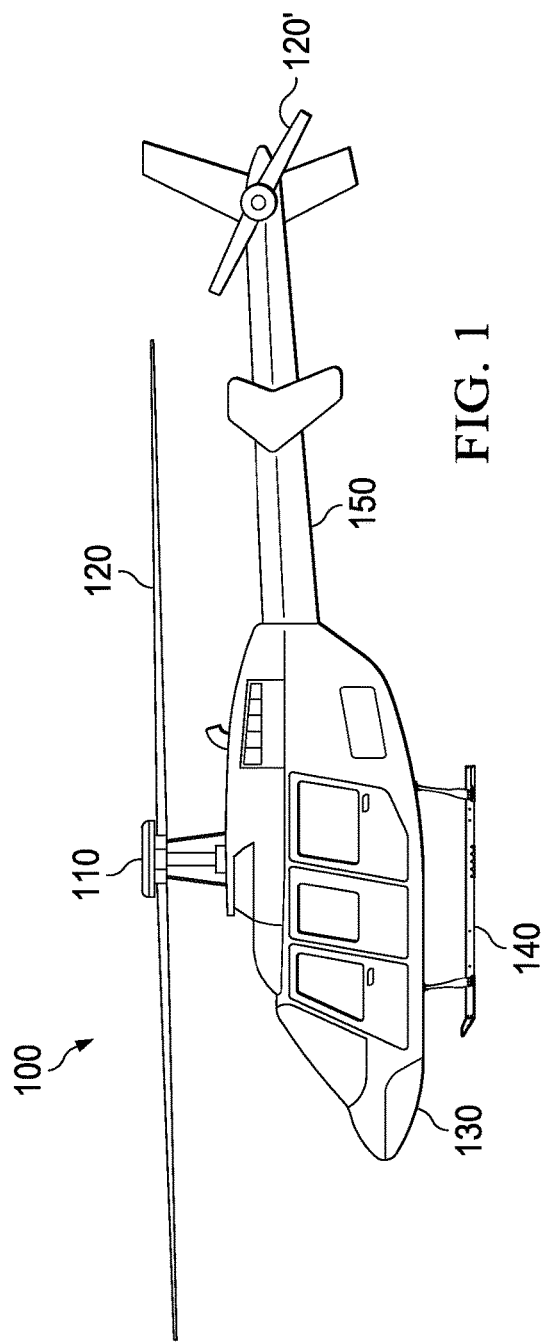
FIG. 1 shows a rotorcraft according to one example embodiment.

FIG. 1 shows a rotorcraft 100 according to one example embodiment. Rotorcraft 100 features a rotor system 110, blades 120, a fuselage 130, a landing gear 140, and an empennage 150. Rotor system 110 may rotate blades 120. Rotor system 110 may include a control system for selectively controlling the pitch of each blade 120 in order to selectively control direction, thrust, and lift of rotorcraft 100. Fuselage 130 represents the body of rotorcraft 100 and may be coupled to rotor system 110 such that rotor system 110 and blades 120 may move fuselage 130 through the air. Landing gear 140 supports rotorcraft 100 when rotorcraft 100 is landing and/or when rotorcraft 100 is at rest on the ground. Empennage 150 represents the tail section of the aircraft and features components of a rotor system 110 and blades 120'. Blades 120' may provide thrust in the same direction as the rotation of blades 120 so as to counter the torque effect created by rotor system 110 and blades 120. Teachings of certain embodiments relating to rotor systems described herein may apply to rotor system 110 and/or other rotor systems, such as other tilt rotor and helicopter rotor systems. It should also be appreciated that teachings regarding rotorcraft 100 may apply to aircraft and vehicles other than rotorcraft, such as airplanes and unmanned aircraft, to name a few examples.

An aircraft, such as a rotorcraft, may be manufactured from a variety of parts. Some of these parts may be moved between aircraft. Some of these parts may also be serviced, maintained, and/or replaced during the life of the part.

Workers may track aircraft part configurations by periodically recording which parts are installed on a particular aircraft. To perform this task, workers may inspect the aircraft and record a part number or serial number for each part installed. In some cases, such a task may be very resource intensive. For example, aircraft may include a large number of parts, and some of these parts may be not convenient to the workers (e.g., inside a small compartment or located high off the ground). Accordingly, teachings of certain embodiments recognize the capability to wirelessly transmit aircraft configuration information to workers.

Workers may also use maintenance information of an aircraft part when servicing, maintaining, and/or replacing the part. For example, workers may access maintenance information describing a history of the aircraft part (e.g., maintenance history, environmental history, service history, repair history) as well as service manuals indicating how the part should be inspected and maintained.

In some circumstances, such maintenance information may be stored in a database accessible by the workers. Such a database, however, may not always be accessible by the workers. For example, the aircraft may undergo repair in remote locations where database access is not available. Accordingly, teachings of certain embodiments recognize the ability to provide a storage medium with the aircraft part that is configured to store maintenance information about the part.

As stated above, aircraft configuration information may be transmitted wirelessly to workers. It may be possible, therefore, to also wirelessly transmit maintenance information to workers using the same wireless communication technique. Teachings of certain embodiments recognize, however, numerous problems associated with using the same communication technique to transmit both aircraft configuration information and maintenance information. For example, in general, transmitting larger amounts of information may necessarily require an increase in power consumption and/or a decrease in transmission range. Maintenance information may include much larger amounts of information than aircraft configuration information, and transmitting maintenance information with aircraft configuration information may increase the power consumption necessary to transmit the aircraft configuration information and/or reduce the transmission range of the aircraft configuration information.

Teachings of certain embodiments recognize, therefore, the ability to optimize the tradeoff between transmission range versus storage capacity by providing two storage and transmission devices: a long-range transmission device (having a limited amount of storage) and a short-range transmission device (having a greater amount of storage). In some embodiments, the long-range transmission device may store and transmit aircraft configuration information, whereas the short-range transmission device may store and transmit maintenance information. Unlike aircraft configuration information, the short-range transmission device may be appropriate for maintenance information because storage capacity may be a higher priority than transmission range (e.g., because maintenance information is used primarily by workers that have direct contact with the aircraft part when servicing or replacing the part).

Figure 2A:
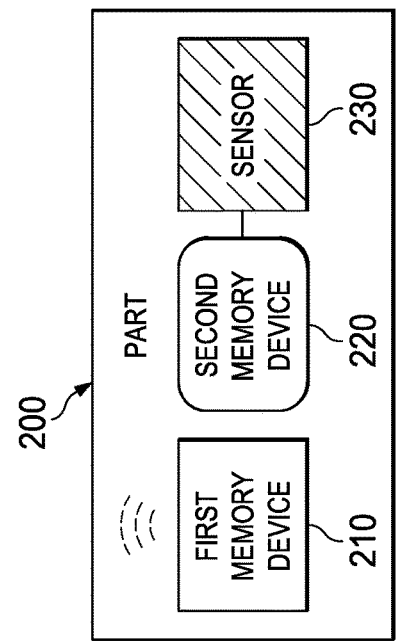
FIGS. 2A and 2B show parts associated with the rotorcraft of FIG. 1 according to one example embodiment.

FIG. 2A shows a part 200 according to one embodiment. Part 200 may represent an aircraft part associated with an aircraft such as rotorcraft 100 of FIG. 1. For example, part 200 may represent a rotor blade, an abrasion strip on a rotor blade, a bearing, or any number of other parts.

In the example of FIG. 2A, a first storage device 210 and a second storage device 220 are coupled to part 200. In some embodiments, first storage device 210 and/or second storage device 220 may be coupled proximate to part 200 but not necessarily to part 200. For example, if part 200 is a bearing, first storage device 210 and/or second storage device 220 may be coupled to a surface near part 200.

First storage device 210 may be operable to store and transmit a first set of information identifying part 200. Examples of first storage device 210 may include, but are not limited to, passive and active radio-frequency identification (RFID) tags. RFID is the use of a wireless non-contact system that uses radio-frequency electromagnetic fields to transfer data from a tag attached to or near an object. Passive RFID tags may not require a battery, but rather may be powered by the electromagnetic fields used to read them. Active RFID tags, on the other hand, may use a local power source and emit radio waves (electromagnetic radiation at radio frequencies). An RFID tag may contain electronically stored information which can be read at a distance. Unlike a bar code, the RFID tag does not necessarily need to be within line of sight of the reader and may even be embedded in the tracked object.

In some embodiments, the first set of information stored and transmitted by first storage device 210 may represent the aircraft configuration information from the previous example. For example, the first set of information identifying the aircraft part may include a part number unique to a category of aircraft parts and a serial number unique to the individual aircraft part. As stated above, the more information that is stored and transmitted may reduce the transmission range of first storage device 210. Accordingly, teachings of certain embodiments recognize that limiting first storage device 210 to a small amount of information (e.g., only part number and serial number) may optimize the transmission range of first storage device 210.

Second storage device 220 may be operable to store and transmit a second set of information about part 200. Second storage device 210 may have a larger storage/transmission capacity than first storage device 210 but may also have a shorter transmission range. For example, one example of second storage device 220 may include, but is not limited to, a contact memory button (CMB) or flash memory device. CMBs are electronic devices that can receive, store, and/or transmit information when contacted with a touch probe. CMBs may have a larger storage/transmission capacity than RFID tags but may also have a shorter transmission range. For example, CMBs may store approximately four gigabytes of information, whereas an RFID tag may store approximately 512 bits of information. The CMBs, however, may have a 0 foot transmission range (i.e., transmits information only when contacted), whereas the 512-bit RFID tag may transmit information up to 20 feet.

Another example of second storage device 220 may include, but is not limited to, a higher-capacity RFID tags. For example, a higher-capacity RFID tag may store approximately 4000 or 8000 bytes of information. This higher-capacity RFID tag, however, may only have a transmission range of approximately 4 feet, which is substantially smaller than the 20 foot transmission range of a 512-bit RFID tag.

Second storage device 220 may store a myriad of information about part 200. For example, storage device 200 may store information describing a history of part 200 (e.g., maintenance history, environmental history, service history, repair history) as well as service manuals indicating how the part should be inspected and maintained. For example, second storage device 220 may store a service manual indicating how part 200 should be inspected as well as information detailing the results of previous inspections of part 200.

Teachings of certain embodiments also recognize that maintaining this second set of information with part 200 may make the second set of information more useful for workers. For example, storing maintenance records with the part makes such information more accessible as compared to storing such information in a database. Not only may it be more convenient to collect such information when the worker is physically working with the part, but the worker may not even have access to databases. The worker may not even have access to the internet, which could make it difficult for the worker to access service manuals for the part. Furthermore, different part models may be associated with different service manual versions, and storing the appropriate service manual locally with the part may help ensure that the worker uses the correct service manual when servicing the part. For example, different part models may have different damage limits, and it may be important for workers to access the correct service manual in order to apply the correct damage limit values when servicing the part.

In some embodiments, second storage device 220 may store environmental history of part 200. In general, some aircraft parts may be subject to different environmental stresses. For example, rotorcraft 100 may operate in tropical environments where the air is more saturated with humidity. As another example, rotorcraft 100 may operate in marine environments where the air has higher levels of salinity, which may cause corrosion. As yet another example, rotorcraft 100 may operate in deserts where sand and other particulates may wear down rotorcraft components.

Such environmental stresses are not limited to when rotorcraft 100 is flying. For example, operation of rotorcraft 100 in a desert environment may include both flying rotorcraft 100 and parking rotorcraft 100 between flights. In this example, both flying and parking rotorcraft 100 may subject rotorcraft 100 to sand and other particulates.

Damage to part 200 may depend on the severity of exposure to environmental stresses. For example, damage may result from prolonged exposure from environmental stresses. In addition, damage may result from extreme exposure to environmental stresses, even if such exposure is short-lived. Furthermore, some parts 200 may be more susceptible to prolonged exposure to environmental stresses, whereas other parts may be more susceptible to extreme environmental stresses.

Aircraft parts may be designed to withstand expected environmental stresses. Different aircraft may fly in many different environments, however. Some aircraft may be exposed to more environmental stresses, whereas other aircraft may be exposed to less environmental stresses. Accordingly, teachings of certain embodiments recognize the capability to measure and store an environmental history of part 200.

In the example of FIG. 2A, part 200 features an environmental sensor 230. Environmental sensor 230 may measure aspects of the natural environment of which part 200 is subject to. Examples of environmental sensor 230 may include, but are not limited to, a humidity sensor, a salinity sensor, a corrosivity sensor, a particulate sensor, a pressure sensor, and a vibration sensor. Humidity sensors are operable to measure humidity in the atmosphere proximate to part 200. Salinity sensors are operable to measure salinity in the atmosphere proximate to part 200. Corrosivity sensors are operable to measure existence of corrosive substances proximate to part 200 or conditions favorable for corrosion part 200. Particulate sensors are operable to measure existence of particulates proximate to part 200. Particulate sensors may also measure the size and density of particulates, as well as other information. Pressure sensors may measure and determine information such as ambient air pressure (or pressure altitude) and dynamic air pressure (such that airspeed may be determined). Vibration sensors may measure vibration forces on part 200.

In the example of FIG. 2A, environmental sensor 230 is configured to communicate environmental history information directly to second storage device 220 (either wirelessly or through a wired connection). In this example, environmental sensor 230 may be configured to communicate environmental history information to second storage device 220 over an extended period of time (e.g., multiple flights or missions).

In some embodiments, however, environmental sensor 230 may be a "sacrificial" sensor. Sacrificial sensors are sensors that are permanently altered after performing one or more measurements such that the sacrificial sensor must be replaced before performing additional measurements. For example, some corrosivity sensors may detect corrosion of nearby parts by itself becoming corroded. In some embodiments, measurements from sacrificial sensors may be collected by a worker at the time of replacement, who may upload these measurements to second storage device 220. In some embodiments, these measurements may be associated with an approximate timestamp, indicating when the measurements are believed to have been taken. Alternatively, measurements may be associated with a known period of exposure based on an installation timestamp (indicating when the sensor was installed) and a removal timestamp.

Figure 2B:
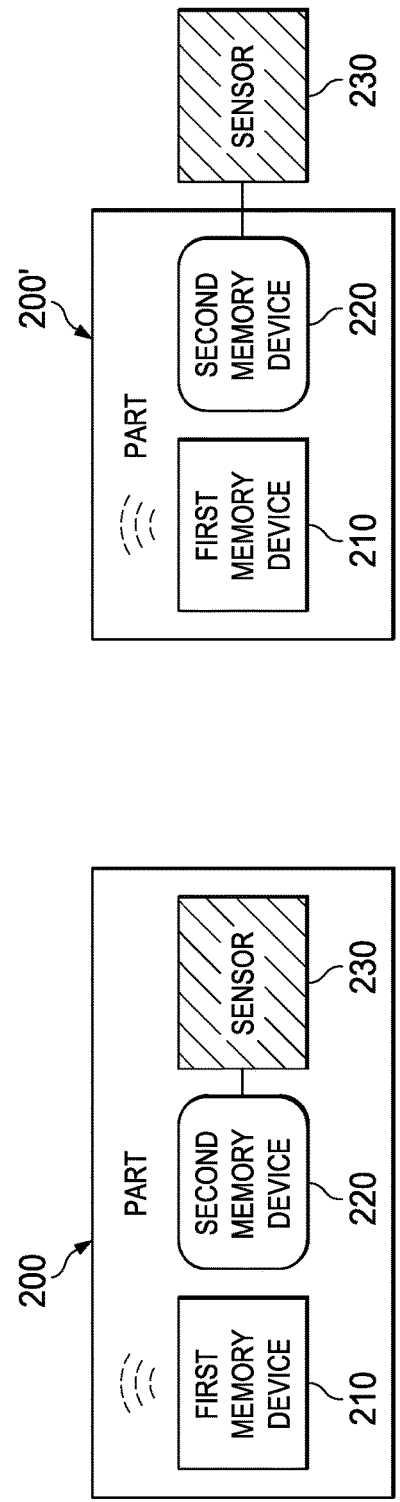

In the example of FIG. 2A, environmental sensor 230 is coupled to part 200. In some embodiments, however, environmental sensor 230 may be coupled proximate to part 200 but not necessarily to part 200. For example, if part 200 is a bearing, environmental sensor 230 may be coupled to a surface near part 200. As another example, part 200 and environmental sensor 230 may be located in the same enclosed area, such as shown in FIG. 2B. For example, a humidity sensor may be located in areas within rotorcraft 100 where humidity may build up due to humidity in the air surrounding rotorcraft 100.

FIG. 3 shows aircraft part information correlation system 300 according to one example embodiment. In general, system 300 features an aircraft configuration data repository 310, a part history repository 320, a correlation engine 330, and a correlated part history repository 340. Aircraft configuration data repository 310 and part history repository 320 may receive information from first storage device 210 and second storage device 220 through interfaces 315 and 325, respectively. In one example embodiment, interface 315 is an RFID tag scanner, and interface 325 is a CMB reader.

Users 5 may access system 300 through computer systems 10. For example, in some embodiments, users 5 may access aircraft configuration data repository 310, part history repository 320, correlation engine 330, and correlated part history repository 340 through computer systems 10. Users 5 may include any individual, group of individuals, entity, machine, and/or mechanism that interacts with computer systems 10. Examples of users 5 include, but are not limited to, a pilot, service person, engineer, technician, contractor, agent, and/or employee. Users 5 may be associated with an organization. An organization may include any social arrangement that pursues collective goals. One example of an organization is a business. A business is an organization designed to provide goods or services, or both, to consumers, governmental entities, and/or other businesses.

Computer system 10 may include processors 12, input/output devices 14, communications links 16, and memory 18. In other embodiments, computer system 10 may include more, less, or other components. Computer system may be operable to perform one or more operations of various embodiments. Although the embodiment shown provides one example of computer system 10 that may be used with other embodiments, such other embodiments may utilize computers other than computer system 10. Additionally, embodiments may also employ multiple computer systems 10 or other computers networked together in one or more public and/or private computer networks, such as one or more networks 30.

Processors 12 represent devices operable to execute logic contained within a medium. Examples of processor 12 include one or more microprocessors, one or more applications, and/or other logic. Computer system 10 may include one or multiple processors 12.

Input/output devices 14 may include any device or interface operable to enable communication between computer system 10 and external components, including communication with a user or another system. Example input/output devices 14 may include, but are not limited to, a mouse, keyboard, display, and printer.

Network interfaces 16 are operable to facilitate communication between computer system 10 and another element of a network, such as other computer systems 10. Network interfaces 16 may connect to any number and combination of wireline and/or wireless networks suitable for data transmission, including transmission of communications. Network interfaces 16 may, for example, communicate audio and/or video signals, messages, internet protocol packets, frame relay frames, asynchronous transfer mode cells, and/or other suitable data between network addresses. Network interfaces 16 connect to a computer network or a variety of other communicative platforms including, but not limited to, a public switched telephone network (PSTN); a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable network interfaces; or any combination of the preceding.

Memory 18 represents any suitable storage mechanism and may store any data for use by computer system 10. Memory 18 may comprise one or more tangible, computer-readable, and/or computer-executable storage medium. Examples of memory 18 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

In some embodiments, memory 18 stores logic 20. Logic 20 facilitates operation of computer system 10. Logic 20 may include hardware, software, and/or other logic. Logic 20 may be encoded in one or more tangible, non-transitory media and may perform operations when executed by a computer. Logic 20 may include a computer program, software, computer executable instructions, and/or instructions capable of being executed by computer system 10. Example logic 20 may include any of the well-known OS2, UNIX, Mac-OS, Linux, and Windows Operating Systems or other operating systems. In particular embodiments, the operations of the embodiments may be performed by one or more computer readable media storing, embodied with, and/or encoded with a computer program and/or having a stored and/or an encoded computer program. Logic 20 may also be embedded within any other suitable medium without departing from the scope of the invention.

Various communications between computers 10 or components of computers 10 may occur across a network, such as network 30. Network 30 may represent any number and combination of wireline and/or wireless networks suitable for data transmission. Network 30 may, for example, communicate internet protocol packets, frame relay frames, asynchronous transfer mode cells, and/or other suitable data between network addresses. Network 30 may include a public or private data network; one or more intranets; a local area network (LAN); a metropolitan area network (MAN); a wide area network (WAN); a wireline or wireless network; a local, regional, or global communication network; an optical network; a satellite network; a cellular network; an enterprise intranet; all or a portion of the Internet; other suitable communication links; or any combination of the preceding. Although the illustrated embodiment shows one network 30, teachings of certain embodiments recognize that more or fewer networks may be used and that not all elements may communicate via a network. Teachings of certain embodiments also recognize that communications over a network is one example of a mechanism for communicating between parties, and any suitable mechanism may be used.

Aircraft configuration data repository 310 may store aircraft configuration information from first storage device 210. For example, aircraft configuration data repository 310 may store, for a certain aircraft, the part and serial numbers for each part installed on the aircraft at a certain time. Aircraft configuration data repository 310 may store such information for multiple aircraft and over a period of time such that one may determine both how aircraft configurations have changed over time and how parts have moved over time. For example, aircraft configuration data repository 310 may indicate, for a certain aircraft part, whether or not the aircraft part has been in service and, if so, each aircraft in which the part has been installed.

Part history repository 320 may store part information from second storage device 220. For example, part history repository 320 may store, for a certain aircraft part, maintenance history, environmental history, service history, and repair history. In some embodiments, information stored in part history repository 320 may duplicate information stored by second storage device 220 proximate to part 200.

Correlation engine 330 may correlate information between aircraft configuration data repository 310 and part history repository 320. For example, part history repository 320 may include environmental history information for part 200 but may not indicate the aircraft associated with part 200 at the time the environmental history was recorded. Correlation engine 330 may identify the aircraft corresponding to part 200 during the environmental history by referring to aircraft configuration data repository 310. In this manner, correlation engine 330 may take environmental history for part 200 and determine the environmental history of the corresponding aircraft. Such correlated part and aircraft history may be stored in correlated part history 340.

Modifications, additions, or omissions may be made to the systems and apparatuses described herein without departing from the scope of the invention. The components of the systems and apparatuses may be integrated or separated. Moreover, the operations of the systems and apparatuses may be performed by more, fewer, or other components. The methods may include more, fewer, or other steps. Additionally, steps may be performed in any suitable order.

Although several embodiments have been illustrated and described in detail, it will be recognized that substitutions and alterations are possible without departing from the spirit and scope of the present invention, as defined by the appended claims.

To aid the Patent Office, and any readers of any patent issued on this application in interpreting the claims appended hereto, applicants wish to note that they do not intend any of the appended claims to invoke paragraph 6 of 35 U.S.C. §112 as it exists on the date of filing hereof unless the words "means for" or "step for" are explicitly used in the particular claim.

What is claimed is:

1. A rotorcraft, comprising:
a body;
a power train coupled to the body and comprising a power source and a drive shaft coupled to the power source;
a hub;
a rotor blade coupled to the hub;
an aircraft part;
an aircraft part storage system comprising:
    a first storage device comprising a radio frequency identification tag coupled to the aircraft part and operable to store and transmit a first set of information identifying the aircraft part; and
    a second storage device comprising a contact memory button coupled to the same aircraft part and operable to store and transmit a second set of information about the aircraft part, the second storage device having a larger storage capacity than the first storage device but a shorter transmission range than the first storage device;
    a vibration sensor coupled to the rotorcraft proximate to the aircraft part and configured to measure and transmit vibration load data to the second storage device, wherein the second set of information about the aircraft part comprises the vibration load data; and
an aircraft part information system comprising:
    a first data repository operable to receive the first set of information about the aircraft part from the first storage device;
    a second data repository operable to receive the second set of information about the aircraft part from the second storage device; and
    a correlation engine operable to correlate information between the first data repository and the second data repository.

2. The rotorcraft of claim 1, wherein the first set of information identifying the aircraft part comprises a part number unique to a category of parts.

3. The rotorcraft of claim 1, wherein the first set of information identifying the aircraft part comprises a serial number unique to the individual aircraft part.

4. The rotorcraft of claim 1, wherein the second set of information about the aircraft part further comprises a maintenance history of the aircraft part.

5. The rotorcraft of claim 1, further comprising an environmental condition sensor coupled to the rotorcraft proximate to the aircraft part and configured to transmit information about at least one aspect of a natural environment to which the aircraft is subject, to the second storage device,
wherein the second set of information about the aircraft part further comprises the information about at least one aspect of a natural environment to which the aircraft is subject.

6. An aircraft part storage system comprising:
a first storage device comprising a radio frequency identification tag, configured to be coupled to an aircraft part, and operable to store and transmit a first set of information about the aircraft part;
a second storage device comprising a contact memory button, configured to be coupled to the same aircraft part, and operable to store and transmit a second set of information about the aircraft part, the second storage device having a larger storage capacity than the first storage device but a shorter transmission range than the first storage device;
a vibration sensor coupled to the rotorcraft proximate to the aircraft part and configured to measure and transmit vibration load data to the second storage device, wherein the second set of information about the aircraft part comprises the vibration load data; and
an aircraft part information system comprising:
a first data repository operable to receive the first set of information about the aircraft part from the first storage device;
a second data repository operable to receive the second set of information about the aircraft part from the second storage device; and
a correlation engine operable to correlate information between the first data repository and the second data repository.

7. The aircraft part storage system of claim 6, wherein the first set of information about the aircraft part comprises information identifying the aircraft part.

8. The aircraft part storage system of claim 7, wherein the information identifying the aircraft part comprises a part number unique to a category of parts.

9. The aircraft part storage system of claim 7, wherein the information identifying the aircraft part comprises a serial number unique to the individual aircraft part.

10. The aircraft part storage system of claim 6, wherein the second set of information about the aircraft part further comprises a maintenance history of the aircraft part.

11. The aircraft part storage system of claim 6, wherein the second set of information about the aircraft part further comprises an environmental history of the aircraft part.

12. The aircraft part storage system of claim 6, further comprising an environmental condition sensor coupled to the rotorcraft proximate to the aircraft part and configured to transmit information about at least one aspect of a natural environment to which the aircraft is subject, to the second storage device,
wherein the second set of information about the aircraft part further comprises the information about at least one aspect of a natural environment to which the aircraft is subject.

13. The aircraft part storage system of claim 6, wherein the first data repository is operable to store the first set of information about the aircraft part as a set of aircraft configuration data.

14. The aircraft part storage system of claim 13, wherein the set of aircraft configuration data comprises one or more serial numbers corresponding to aircraft parts installed on an aircraft over a period of time.

15. The aircraft part storage system of claim 13, wherein the set of aircraft configuration data comprises serial numbers corresponding to aircraft parts installed on multiple aircraft over a period of time.

16. The aircraft part storage system of claim 6, wherein the second set of information about the aircraft part further comprises a set of part history data.

17. The aircraft part storage system of claim 16, wherein the set of part history data comprises a maintenance history for at least one aircraft part.

18. The aircraft part storage system of claim 16, wherein the set of part history data comprises an environmental history for at least one aircraft part.

19. The aircraft part storage system of claim 6, wherein:
the first data repository is operable to store the first set of information about the aircraft part as a set of aircraft configuration data;
the second set of information about the aircraft part further comprises a set of part history data; and
the correlation engine is operable to identify an aircraft corresponding to at least one aircraft part at a time reflected in the part history data.

20. The aircraft part storage system of claim 6, wherein:
the first data repository is operable to store serial numbers corresponding to aircraft parts installed on multiple aircraft over a period of time;
the second data repository is operable to store a maintenance history for at least one aircraft part; and
the correlation engine is operable to identify an aircraft corresponding to the at least one aircraft part at the time of a maintenance event reflected in the maintenance history of the at least one aircraft part.

21. The aircraft part storage system of claim 6, wherein:
the first data repository is operable to store serial numbers corresponding to aircraft parts installed on multiple aircraft over a period of time;
the second data repository is operable to store an environmental history for at least one aircraft part; and
the correlation engine is operable to identify an aircraft corresponding to the at least one aircraft part at the time of an environmental event reflected in the environmental history of the at least one aircraft part.

22. The aircraft part storage system of claim 12, wherein the environmental condition sensor comprises a sacrificial sensor.

23. The aircraft part storage system of claim 12, wherein the environmental condition sensor comprises a salinity sensor.

24. The aircraft part storage system of claim 12, wherein the environmental condition sensor comprises a corrosivity sensor.

25. The aircraft part storage system of claim 12, wherein the environmental condition sensor comprises a particulate sensor.

26. The aircraft part storage system of claim 12, wherein the environmental condition sensor comprises a pressure sensor.

* * * * *